(12) United States Patent
Choudhury et al.

(10) Patent No.: US 7,859,993 B1
(45) Date of Patent: Dec. 28, 2010

(54) TWO-PHASE FAST REROUTE WITH OPTIMIZED TRAFFIC ENGINEERING

(75) Inventors: Gagan L. Choudhury, Marlboro, NJ (US); Angela Lan Chiu, Holmdel, NJ (US); Robert Duncan Doverspike, Tinton Falls, NJ (US); Guangzhi Li, Madison, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 186 days.

(21) Appl. No.: 12/214,375

(22) Filed: Jun. 18, 2008

Related U.S. Application Data (60) Provisional application No. 60/936,765, filed on Jun. 21, 2007.

(51) Int. Cl.
| | |
|---|---|
| G01R 31/08 | (2006.01) |
| G06F 11/00 | (2006.01) |
| G06F 15/177 | (2006.01) |
| G06F 15/173 | (2006.01) |
| H04J 3/14 | (2006.01) |
| H04J 14/00 | (2006.01) |
| H04L 12/26 | (2006.01) |
| H04L 12/28 | (2006.01) |
| H04L 12/56 | (2006.01) |
| H04B 10/00 | (2006.01) |

(52) U.S. Cl. .................. 370/217; 370/228; 370/231; 370/238; 370/252; 370/395.41; 370/401; 398/2; 398/5; 709/221; 709/241; 714/4

(58) Field of Classification Search ......... 370/216–228, 370/238, 252, 395.41; 398/1–8; 709/221, 709/238–241; 714/4

See application file for complete search history.

(56) References Cited

U.S. PATENT DOCUMENTS 7,395,351 B1 * 7/2008 Nucci et al. .................. 709/242

(Continued)

OTHER PUBLICATIONS

Angela L. Chiu, et al.; "Economic Benefits of Transparent OXC Networks As Compared to Long Systems With OADM's"; OFC, Atlanta, Mar. 2003.

(Continued)

*Primary Examiner*—Alpus H Hsu
*Assistant Examiner*—Jeremy Costin (57) ABSTRACT

Systems and methods are described for restoring IP traffic flows routed in an IP network in less than 100 ms after the IP network sustains a network failure. The systems and methods are a two-phase fast reroute that uses distributed optimized traffic engineering during backup tunnel restoration and end-to-end tunnel restoration that maximizes sharing among all independent failure scenarios and minimizes the total capacity, total cost, or a linear combination of the two. For defined failure condition scenarios, restoration traffic is routed using pre-computed backup tunnels using a constrained shortest path first method where link weights along the path are chosen dynamically and depend on available and total capacity of the link, latency, and other cost measures such as IP port costs. During the capacity allocation phase, the method reuses capacity already allocated for other independent failure scenarios as much as possible but also adds capacity, if necessary. When an actual IP network failure occurs, the backup tunnels are used to immediately restore service to affected IP network traffic flows. In parallel, end-to-end tunnels corresponding to each affected traffic flow are rerouted and once the rerouting process is complete, traffic is switched over from the old end-to-end tunnel routes (using backup tunnels) to new end-to-end tunnel routes without using backup tunnels.

20 Claims, 8 Drawing Sheets

U.S. PATENT DOCUMENTS

| | | | |
|---|---|---|---|
| 2002/0174246 A1* | 11/2002 | Tanay et al. | 709/238 |
| 2005/0063299 A1* | 3/2005 | Atkinson et al. | 370/216 |
| 2006/0140111 A1* | 6/2006 | Vasseur et al. | 370/216 |
| 2006/0146696 A1* | 7/2006 | Li et al. | 370/218 |
| 2006/0215548 A1* | 9/2006 | Le Faucheur et al. | 370/228 |
| 2007/0183317 A1* | 8/2007 | Vasseur et al. | 370/225 |
| 2008/0107027 A1* | 5/2008 | Allan et al. | 370/235 |

OTHER PUBLICATIONS

John Strand, et al.; "Realizing The Advantages of Optical Reconfigurability And Restoration With Integrated Optical Cross-Connects"; Journal of Lightwave Technology, vol. 21, No. 11, Nov. 2003.

John Wei, et al.; "Convergence Through Packet-Aware Transport"; The Journal of Optical Networking Special Issue on Convergence, vol. 5(4), Apr. 2006; pp. 221-245.

Gagan L. Choudhury; "Models for IP/MPLS Routing Performance: Convergence, Fast Reroute, and QoS Impact" Keynote Speech, ITCOM's Conference on Performance, Quality of Service and Control of Next Generation Communication Networks II, Philadelphia, PA; 2004.

Robert D. Doverspike; "Fast Restoration in a Mesh Network of Optical Cross-Connects"; Proceedings of Optical Fiber Conference (OFC'99), San Diego, CA, Feb. 1999.

Guangzhi Li, et al.; "Efficient Distributed Path Selection for Shared Restoration Connections"; IEEE Conference on Computer Communication (INFOCOM)2002, New York and Special Issue of IEEE Transactions on Networking, vol. 11 (5), Oct. 2003; pp. 761-771.

D. Ward et al.; "IP Fast-Reroute: Overview and Things We Are Struggling To Solve"; NANOG 33 Meeting, Jan. 31-Feb. 1, 2005, Las Vegas, Nevada.

Gagan L. Choudhury, et al.; "An Algorithm to Compute Blocking Probabilities in Multi-Rate, Multi-Class, Multi-Resource Loss Models"; Advances in Applied Probability, vol. 27, No. 4, pp. 1104-1143, Dec. 1995.

Guangzhi Li, et al.; "Resilience Design in All-Optical ULH Networks", Journal of Optical Networks, 2006.

Angela L. Chiu, et al.; "Joint IP/Optical Layer Restoration After a Router Failure", OFC2001, Anaheim, CA, Mar. 2001.

Panagiotis Sebos, et al.; "Ultra-fast IP Link and Interface Provisioning With Applications to IP Restoration"; IEEE OFC, 2003.

Guangzhi Li, et al.; "IP Over Optical Cross-Connect Architectures"; IEEE OFC, 2003.

Guangzhi Li, et al.; "Efficient Distributed Restoration Path Selection for Shared Mesh Restoration"; IEEE, undated.

\* cited by examiner

FIG. 1

R1, R2, R3, R4, R5, R6 = IP ROUTERS
L1, L2, L3, L4, L5, L6 = IP LINKS

TWO-PHASE FAST REROUTE WITH OPTIMIZED TRAFFIC ENGINEERING

CROSS REFERENCE TO RELATED APPLICATIONS

This application claims the benefit of U.S. Provisional Application No. 60/936,765, filed on Jun. 21, 2007, the disclosure which is incorporated herein by reference in its entirety.

BACKGROUND OF THE INVENTION

The invention relates generally to network communications. More specifically, the invention relates to systems and methods that optimize traffic engineering for restoring traffic in IP networks constructed over a variety of physical network architectures following IP Router failures, IP link failures; or a combination.

Figure 1:
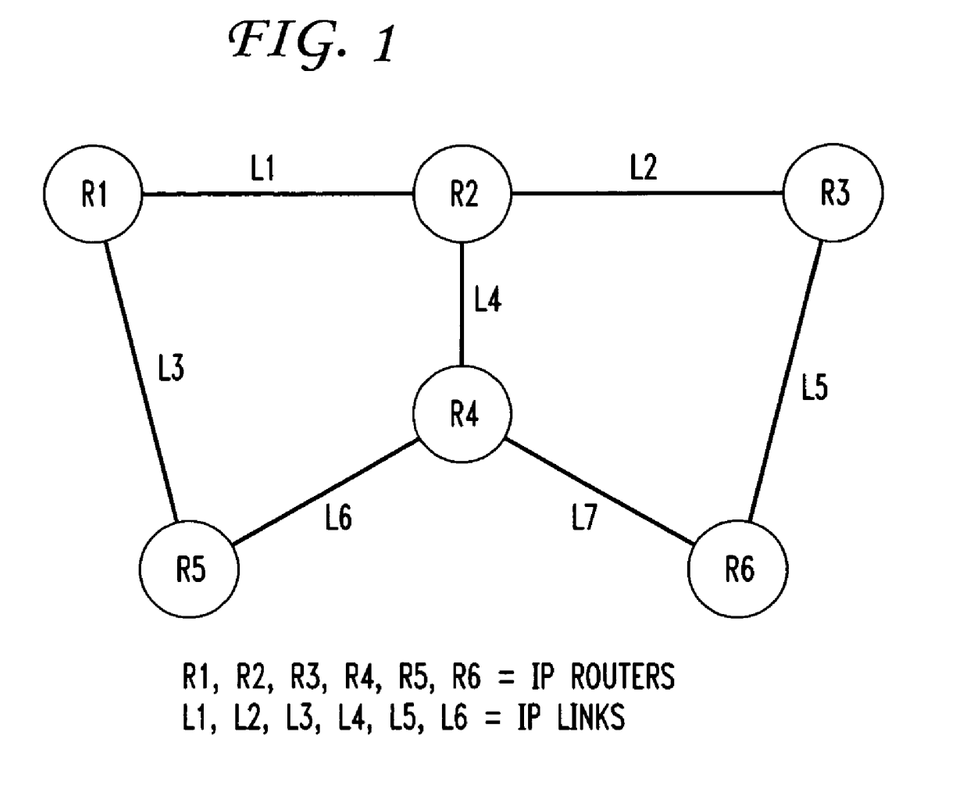
FIG. 1 is an exemplary IP network.
Figure 2:
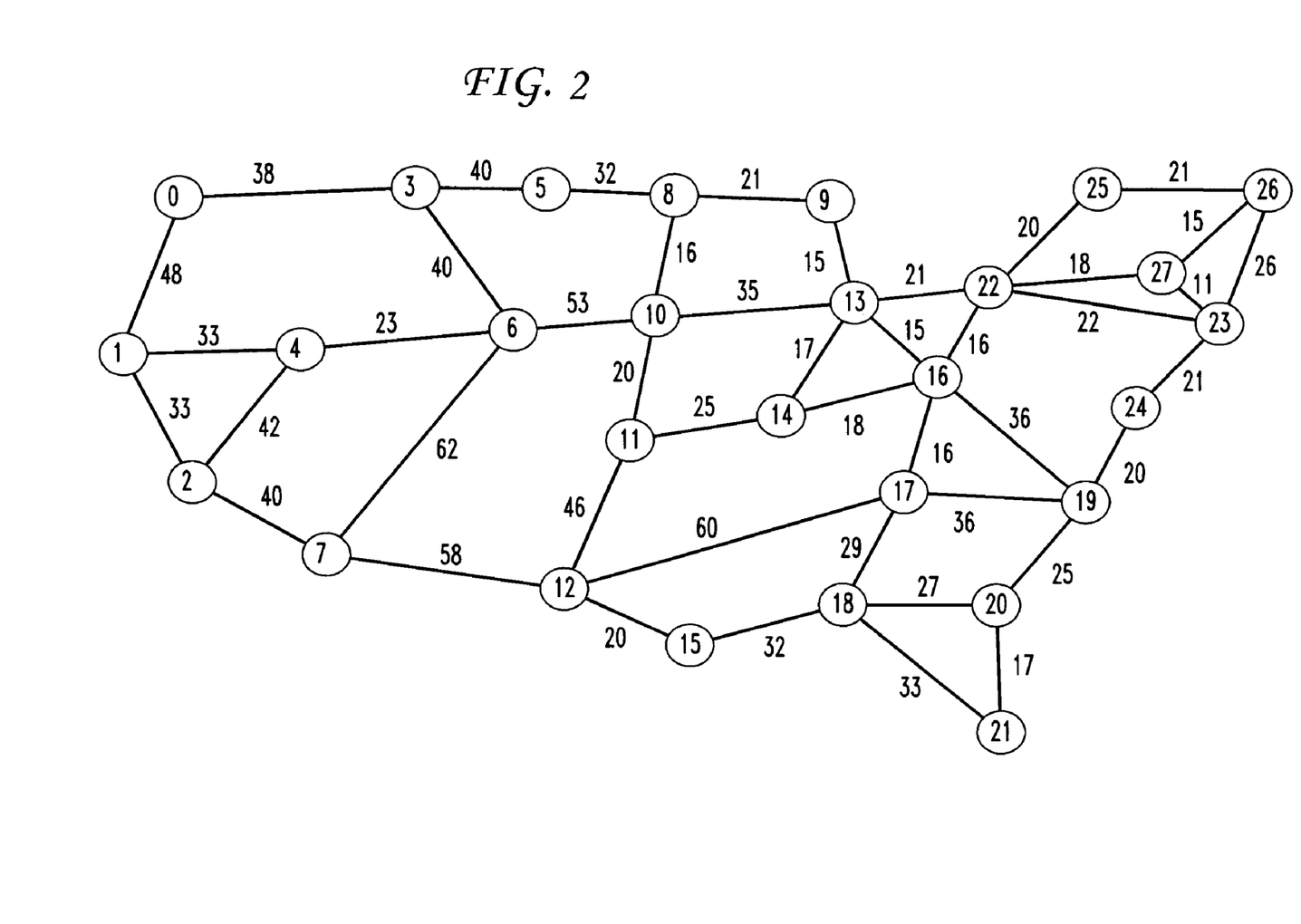
FIG. 2 is an exemplary IP backbone network.

FIG. 1 shows an exemplary IP network comprising six IP Routers and seven IP links. IP traffic may originate at any of the IP Routers and may travel to any of the other IP Routers over a sequence of one or more IP links. Each IP link may go over a sequence of Layer 1 links using a variety of technologies such as Gigabit Ethernet or Ultra Long Haul (ULH) technologies using Dense Wavelength Division Multiplexing (DWDM). FIG. 2 shows a backbone IP network comprising 28 Routers and 45 fiber links.

One challenge for IP service restoration is to provide sub-second or sub-100 ms single-failure restoration for real-time, or near real-time IP services such as Internet Protocol Television (IPTV), Voice over Internet Protocol (VoIP), gaming, and others, while maintaining efficient bandwidth utilization.

The two most prevalent methods for IP-layer (Layer 3) restoration are IP reroute and Multi Protocol Label Switching (MPLS) Fast Reroute (FRR). IP reroute is the default and the most common restoration method in large commercial IP networks. It routes traffic along the shortest path using a certain link weight metric such as latency or inverse of link capacity. It uses Interior Gateway Protocols (IGP) such as Open Shortest Path First (OSPF) or Intermediate System to Intermediate System (IS-IS) for general topology discovery and updates, and then re-computes paths upon a failure. Using default OSPF or IS-IS timer values, re-convergence may take seconds. Through the skillful tuning of OSPF/IS-IS timer values, re-convergence time can be reduced to a few seconds but sub-second convergence is not possible.

MPLS Fast Reroute is an Internet Engineering Task Force (IETF) standardized protocol where primary and backup (restoration) Label Switched Paths (LSPs) are established for next-hop or next-next-hop MPLS FRR (the former can protect against link failures and the latter can protect against link or router failures). When a failure is detected at the upstream router from the failure, the MPLS forwarding label for the backup LSP is pushed on the MPLS shim header at the upstream router and popped at the downstream router (next-hop or next-next-hop). These labels are pre-calculated and stored in the forwarding tables, so restoration is very fast (sub-100 ms restoration is achievable and traffic switchover time below 50 ms has been measured in lab experiments). However, in this scheme, IP traffic flows stay routed over the backup paths until the failure is restored. Because these paths are segmental patches to the primary paths, the technique has poor capacity for restoring all traffic assuming that the backup paths follow the shortest paths. The restoration paths also have poor latency behavior. Resource utilization and latency of the technique suffers even further if there is a subsequent failure before the original failure has been repaired which can take several hours.

The prior art has considered MPLS FRR and IP/Label Distribution Protocol (LDP) FRR which may provide sub-100 ms failure restoration, but not efficient bandwidth utilization. The prior art considered optimized traffic engineering for IP routing that has efficient bandwidth utilization but not sub-100 ms failure restoration.

What is desired is a sub-100 ms restoration system and method that maximizes sharing among single/multiple failures of links, routers, and Shared Risk Link Groups (SRLGs) while minimizing overall capacity or overall cost.

SUMMARY OF THE INVENTION

The inventors have discovered that it would be desirable to have systems and methods that perform sub-100 ms restoration for IP networks after experiencing single/multiple failures. Embodiments provide a two-phase fast reroute system and method that includes optimized traffic engineering for restoring traffic in an IP network.

Embodiments provide a two-phase fast reroute system and method with optimized traffic engineering. The first phase uses pre-computed next-hop or next-next-hop backup tunnels with backup tunnel headends located at Routers adjacent to a failure. As soon as the failure happens, it is immediately detected by the Routers next to the failure which immediately switch traffic over to the pre-computed backup tunnels. This allows sub-100 ms restoration of traffic even though the pre-computed backup tunnel traffic path may not be optimal.

In the second phase, primary tunnel traffic is rerouted over optimized end-to-end paths following IGP and Resource Reservation. Protocol-Traffic Engineering (RSVP-TE) convergence. The rerouting process is relatively slow and may take several seconds. However, no traffic loss is involved since traffic flow is maintained during this phase over the backup tunnels. After reroute of primary tunnels, traffic is switched over from the old primary+backup tunnels to the new primary tunnels. No traffic loss occurs during this procedure.

An optimized traffic engineering method is used to maximize sharing among all independent failure scenarios and also among different phases of restoration with the objective of minimizing overall capacity or overall cost. Further optimization of network resource usage may be achieved by allowing only a subset of the traffic classes (more important ones) to be restored during phase 1 of the fast reroute method. Embodiments allow for real-time sensitive IP services, such as IPTV, VoIP, gaming, and others to have a sub-100 ms failure restoration while maintaining efficient bandwidth utilization and efficient latency behavior of traffic flows. Following a failure event, the network is ready for efficient failure restoration for subsequent failures.

One aspect of the invention provides a method for restoring an IP traffic flow routed in an IP network after the IP network experiences an IP router failure, an IP link failure, or a combination of failures. Methods according to this aspect of the invention include establishing a traffic matrix for the IP network, defining a set of failure condition scenarios, defining a utilization level for each IP link, defining a static weight for each IP link, in a first phase comprising creating backup tunnels for each existing IP traffic flow that is affected by one of the failure condition scenarios, routing each backup tunnel using a Constrained Shortest Path First (CSPF) method optimized with each IP link's dynamic weight which may be the same as their static weight, a function of the static weight, or infinity, augmenting an IP link's capacity if necessary to:

support that IP link's utilization level, storing a backup tunnel for each existing IP traffic flow relating to each failure condition scenario, during an actual IP network failure condition, in a second phase comprising matching the actual network failure condition to a failure condition scenario, switching existing IP traffic flows affected by the network failure condition to a backup tunnel corresponding to that failure condition scenario, creating new end-to-end tunnels for each existing IP traffic flow that is affected by the actual network failure condition, routing each end-to-end tunnel using a CSPF method optimized with each IP link's dynamic weight which may be the same as their static weight, a function of the static weight, or infinity, augmenting an IP link's capacity if necessary to support that IP link's utilization level, and switching network traffic in service over a combination of existing traffic flows and backup tunnels to the new end-to-end tunnels.

The details of one or more embodiments of the invention are set forth in the accompanying drawings and the description below. Other features, objects, and advantages of the invention will be apparent from the description and drawings, and from the claims.

DETAILED DESCRIPTION

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having," and variations thereof herein is meant to encompass the items listed thereafter and equivalents thereof as well as additional items.

The terms "connected" and "coupled" are used broadly and encompass both direct and indirect connecting, and coupling. Further, "connected" and "coupled" are not restricted to physical or mechanical connections or couplings.

It should be noted that the invention is not limited to any particular software language described or that is implied in the figures. One of ordinary skill in the art will understand that a variety of alternative software languages may be used for implementation of the invention. It should also be understood that some of the components and items are illustrated and described as if they were hardware elements, as is common practice within the art. However, one of ordinary skill in the art, and based on a reading of this detailed description, would understand that, in at least one embodiment, components in the method and system may be implemented in software or hardware.

Embodiments of the invention provide methods, system frameworks, and a computer-usable medium storing computer-readable instructions for a two-phase fast reroute method with optimized traffic engineering that restores IP services and maximizes sharing among single/double failures of links, Routers, and SRLGs, and minimizes overall capacity or overall cost. The invention is a modular framework and is deployed as software as an application program tangibly embodied on a program storage device. The application code for execution can reside on a plurality of different types of computer readable media known to those skilled in the art.

Embodiments are applicable for an IP network using MPLS. However, the main concepts are applicable in a more general setting assuming a Generalized MPLS (GMPLS) control plane supporting multiple types of Traffic Switching such as Time Division Multiplexing (TDM) Switching, Lambda Switching, and Fiber (Port) Switching in addition to Packet Switching.

FIG. 1 shows an exemplary IP network comprising six IP Routers and seven IP links. IP traffic may originate at any of the IP Routers and may travel to any of the other IP Routers over a sequence of one or more IP links. Each IP link may go over a sequence of layer 1 links using a variety of technologies such as Gigabit Ethernet or Ultra Long Haul (ULH) technologies using Discrete Wavelength Division Multiplexing (DWDM). Multiple IP links may share the same layer 1 link and so a single layer 1 link failure may cause the failure of multiple IP links.

Embodiments provide sub-second IP service restoration for high-priority IP services while maintaining efficient bandwidth use. Two common methods for IP-layer restoration are IP reroute and MPLS Fast Reroute (FRR).

Embodiments restore IP services using a two-phase fast reroute method in conjunction with optimized traffic engineering. Embodiments obviate the several seconds to tens of seconds of restoration time required by OSPF and IS-IS, and the poor restoration capacity offered by MPLS.

Embodiments model a network by specifying a predetermined amount of capacity on each IP link, and by specifying the routing of each traffic flow during normal operation and during failure scenarios. During normal operation and operation after experiencing a failure, traffic at that time in the network may be routed successfully without causing congestion on any link. In addition, the restoration time for traffic flows affected by the failure and requiring restoration (for each failure scenario) is less than 100 ms in conjunction with the total network capacity, and/or capacity-miles, and/or cost being minimized.

Figure 3:
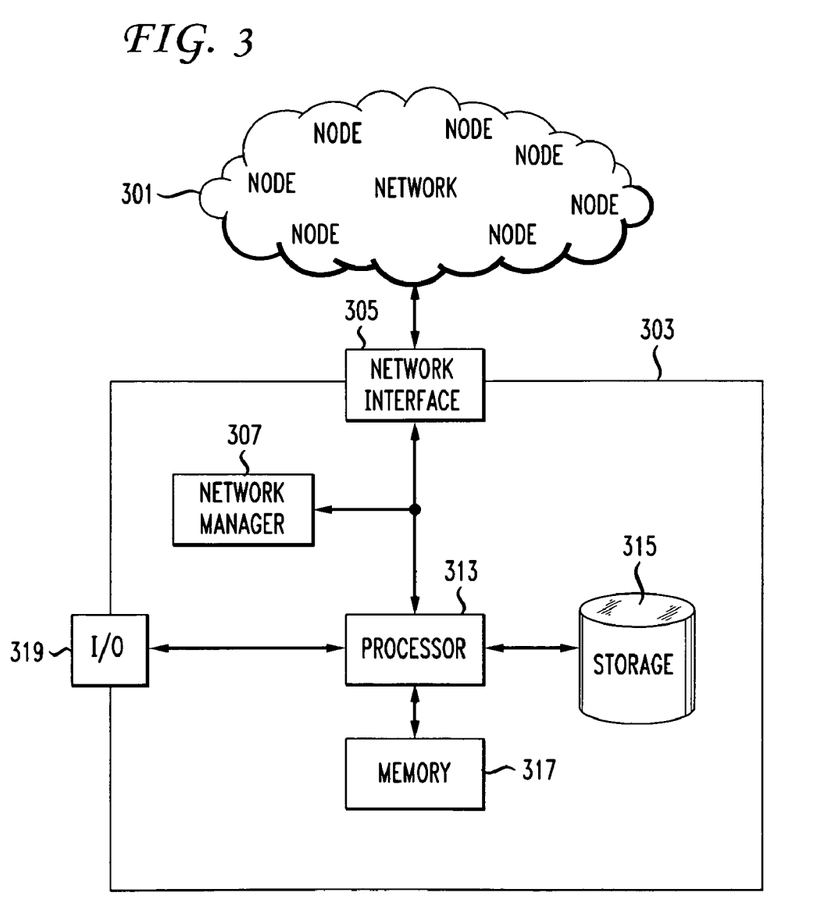
FIG. 3 is an exemplary system framework.
Figure 4:
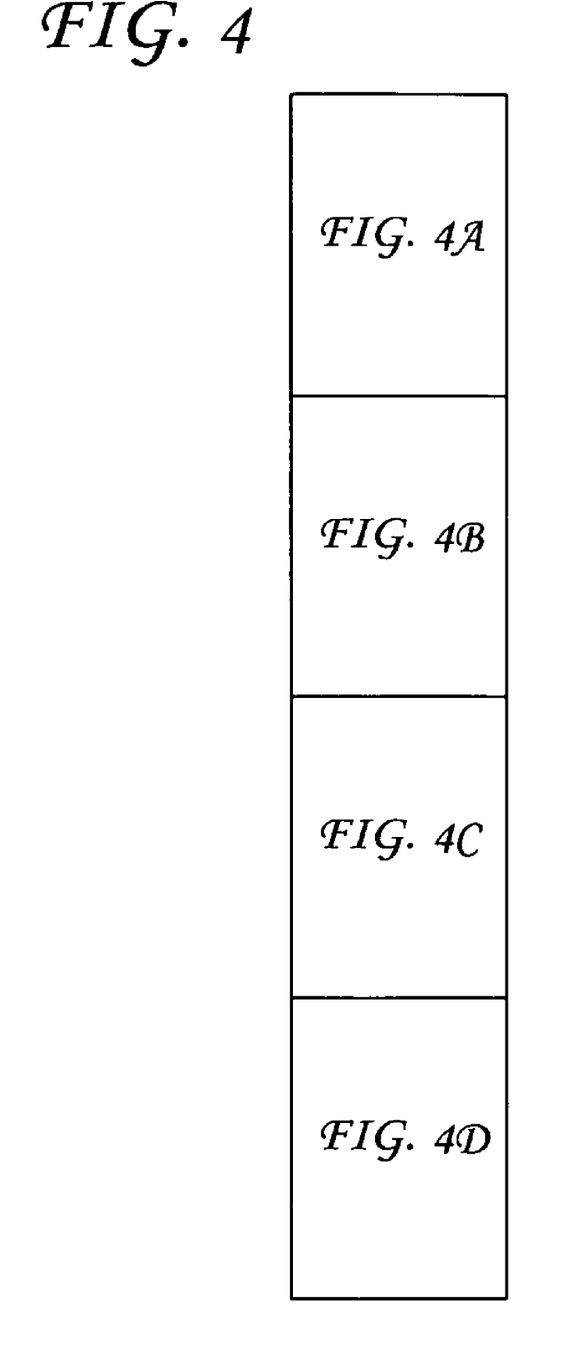
FIG. 4 is an exemplary method.
Figure 4A:
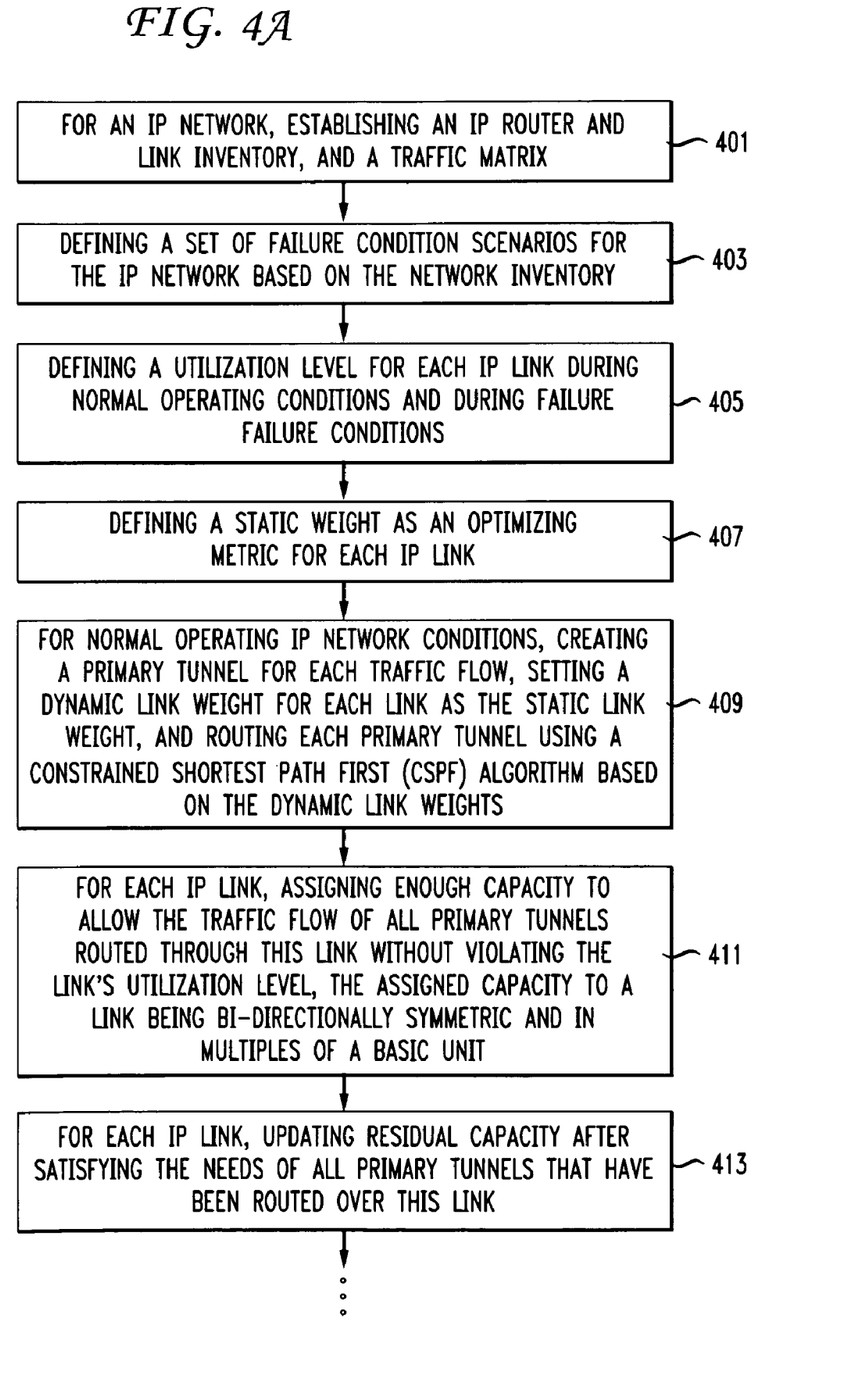
Figure 4B:
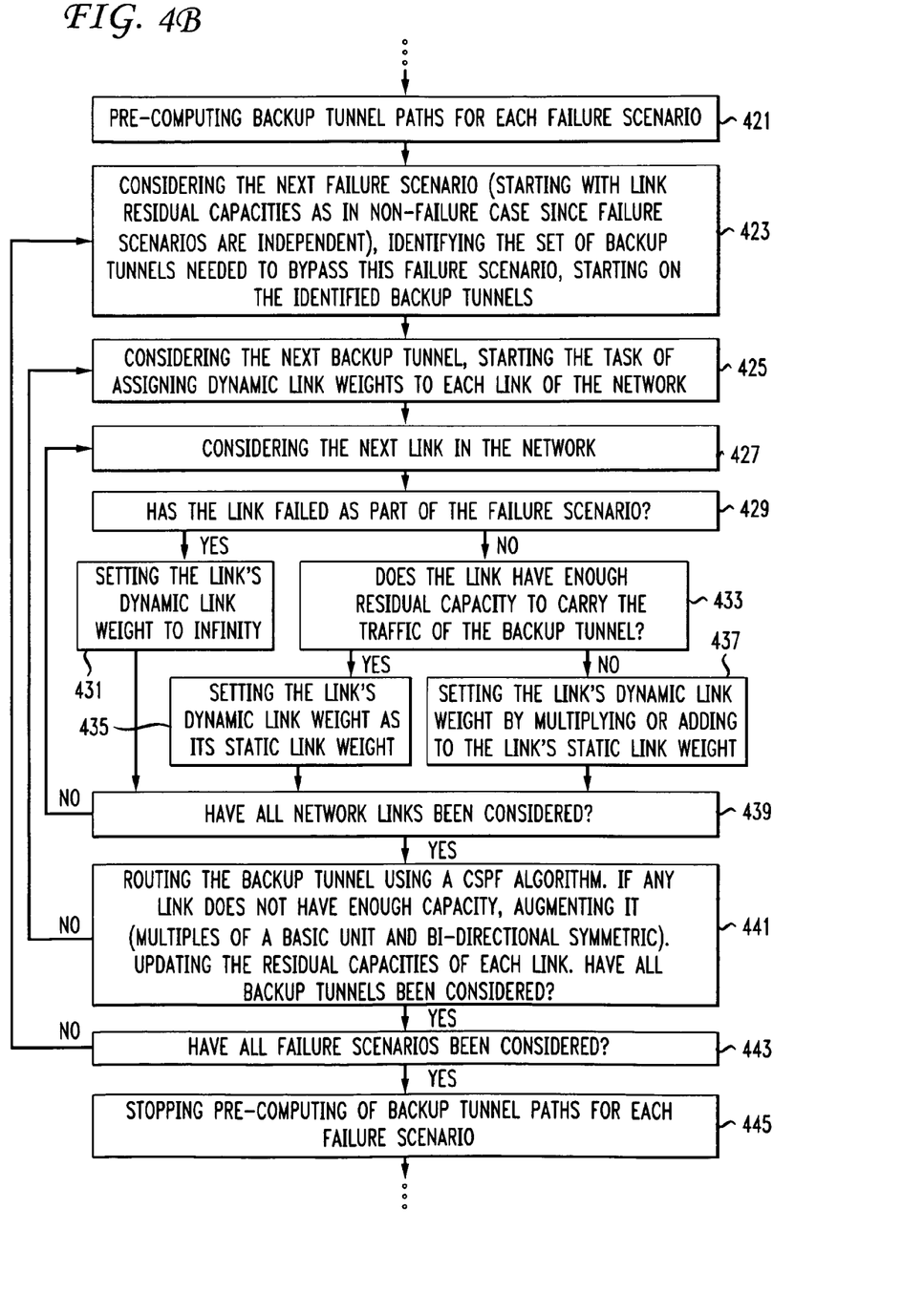
Figure 4C:
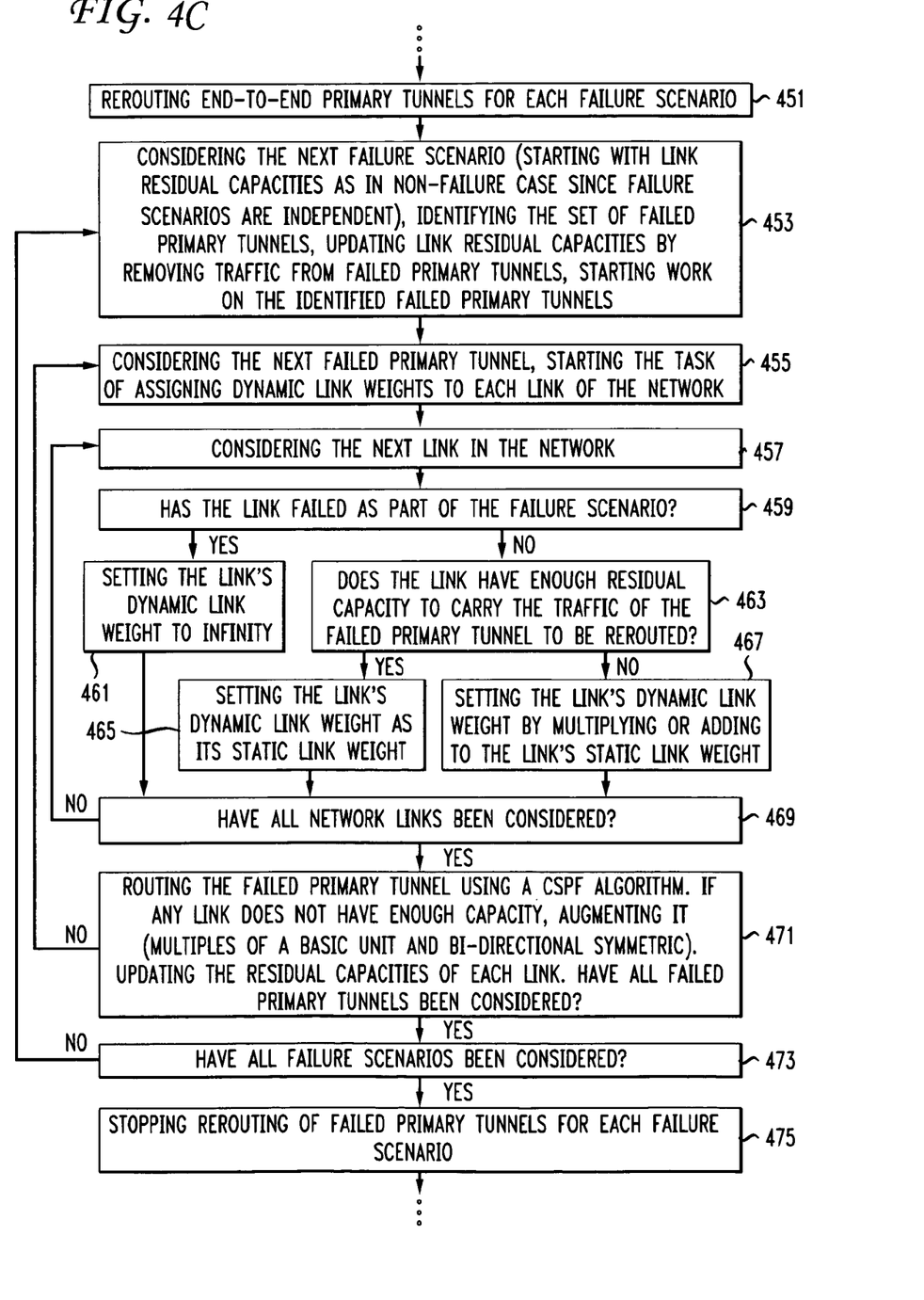
Figure 4D:
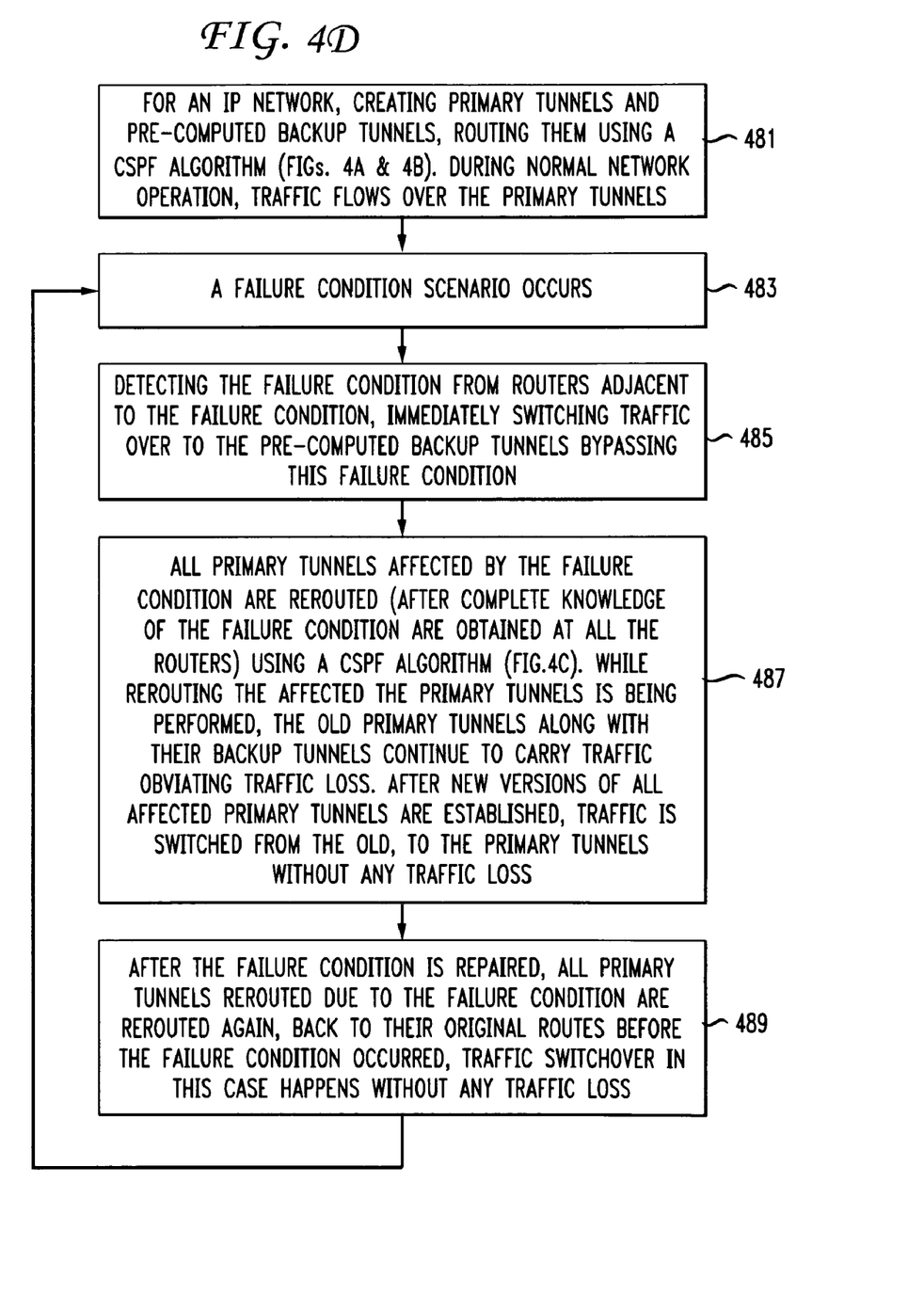

FIG. 3 shows an embodiment of a system 301 framework 303 and FIG. 4 shows a method. The framework 303 includes a network interface 305 coupled to a network and configured to acquire IP network topology information and an IP network traffic matrix. The IP network topology is provided by IGP such as OSPF or IS-IS through their Link State Databases (LSDBs) which are stored in every IP Router and are frequently updated through the flooding of Link State Advertisement (LSA) messages. The traffic matrix may be obtained through live network measurements in conjunction with traffic growth forecasts. For example, live network, measurements may be obtained through Cisco's Netflow mechanism, or by directly collecting traffic data on all RSVP-TE primary tunnels. As an example, in the context of the exemplary IP network in FIG. 1, each of the six IP Routers has an LSDB that has the complete topology including the six Routers and the seven IP links. If any new link is added or any existing link is disconnected, that triggers an LSA flooding which updates each Router's LSDB with the new correct information. Also, whenever there is an IP traffic flow (e.g., traffic originating at R3 and destined to R5), that information can be continuously collected by Cisco's Netflow. Furthermore, if an RSVP-TE tunnel is established from R3 to R5, the traffic flowing over that tunnel is continuously collected. The measurements provide a past and a present traffic matrix. In order to predict a future traffic matrix, some type of trending mechanism may be used. For example, if it is known historically that the traffic from R3 to R5 grows by 10% every month, then that information may be used to predict traffic from R3 to R5 at some future point of time. The IP network interface 305 is coupled to a network manager/inventory database 307, and a processor 313. The processor 313 is coupled to storage 315, memory 317 and I/O 319.

The framework 303 may be implemented as a computer including a processor 313, memory 317, storage devices 315, software and other components. The processor 313 is coupled to the network interface 305, I/O 319, storage 315 and memory 317 and controls the overall operation of the computer by executing instructions defining the configuration. The instructions may be stored in the storage device 315, for example, a magnetic disk, and loaded into the memory 317 when executing the configuration. The invention may be implemented as an application defined by the computer program instructions stored in the memory 317 and/or storage 315 and controlled by the processor 313 executing the computer program instructions. The computer also includes at least one network interface 305 coupled to and communicating with a network such as shown in FIG. 1 to interrogate and receive network configuration or alarm data. The I/O 319 allows for user interaction with the computer via peripheral devices such as a display, a keyboard, a pointing device, and others.

Embodiments allow for use with either an existing IP network, or a new IP network under construction. A typical IP network is defined by a set of IP Routers, which further define a set of IP Links. A network inventory database for the IP network topology and traffic matrix is established (step 401).

Based on network traffic monitoring (e.g., through Cisco Netflow or by collecting traffic at RSVP-TE tunnels) and traffic forecasting, a traffic matrix $T:=(a_{i,j})_{i=1,\ldots,m;j=1,\ldots,n}$ is assembled where i represents the source of traffic, j represents the destination of traffic, m represents total number of sources in the network, and n represents the total number of destinations in the network. Each element (i,j) of the matrix T represents an amount of traffic flow from one router to another. However, between the same pair of Routers there may be multiple traffic flows belonging to different QoS (Quality of Service) classes. Therefore the source i and destination j mentioned above represents a combination of a Router and a QoS class.

For a given IP network, a set of failure scenarios/conditions are created (step 403). The failure scenarios may be determined from customer input or the degree of reliability desired. As an example, in a typical network with a moderate reliability requirement, failure scenarios may include only single link failures. Alternatively, a highly reliable and redundant network may consider all combination of single, double and triple failures of links and/or Routers as failure scenarios. A specific failure condition specifies the failure of one or more IP links and/or one or more IP Routers. Each failure condition also specifies which traffic flows—elements of the traffic matrix—need to be restored. A failure may comprise a hardware, software or procedural error, and when in operation are detected by the Routers via a variety of indirect and direct mechanisms. An indirect mechanism may include missing a sequence of keep-alive messages and a direct mechanism may include some type of explicit Loss of Signal (LOS) message. For each IP link in an existing IP network, or one that is under construction, a maximum allowed utilization level for each IP link is defined and corresponds to either a failure or normal operating condition (step 405). For example, utilization levels for a high-speed 40 Gbps link may be 95% under normal operating conditions and 98% under failure conditions.

A static weight for each IP link is defined that reflects the type of metric that is to be optimized (minimized) by the method (step 407). For example, if the metric that is to be minimized is total network capacity (with each IP link having equal weight), all links may be assigned the same static weight such as 1. If the metric that is to be minimized is a capacity-route-mile product, summed over all IP links, then an IP link weight may be set proportional to its route-mile. If the metric that is to be minimized is a capacity-expense product summed over all IP links for a traffic flow, where expense represents a type of inherent cost of each link, then an IP link weight may be proportional to its expense value. Other metrics for optimization may also be considered.

A simple mechanism for routing traffic flows in IP networks is to use a shortest path routing using Dijkstra's algorithm. In this algorithm, each traffic flow follows a route where sum of the static link weights along the route is minimized. Typical routing protocols such as OSPF and IS-IS use this mechanism. The static link weight stays the same all of the time (unless the link fails) and so this routing mechanism is inflexible and cannot adjust to traffic conditions. A more generalized version, known as the Constrained Shortest Path First (CSPF) algorithm that can adjust to traffic conditions, is used in MPLS-TE routing. As an example, if one link does not have adequate capacity to carry the traffic flow, then the weight of that link can be set to infinity in order to avoid it. Embodiments use a generalized version of the CSPF where each link is assigned a dynamic link weight that can change dynamically with time and can either assume the static link weight (typically under normal operating conditions), or the value infinity (if the link has failed or it really needs to be avoided), or some large finite value (if the link is to be less preferred but not to be avoided altogether).

There are two aspects of the two-phase fast reroute method, the network design aspect and the operational aspect. The network design aspect efficiently allocates just the right amounts of capacities to all IP Links in order to be able to carry traffic under normal operating conditions and all failure conditions. In the operational aspect, the network is already there with the right amounts of capacities (determined by the network design phase) and the goal is to be able to properly, route the traffic under normal operating conditions and all failure conditions. The network design aspect (steps 409 to 475) is taught first followed by the operational aspect (steps 481 to 489).

For new IP networks under construction, the system and method create an MPLS-TE primary tunnel for each traffic flow during normal network operation, sets each dynamic link weight to be the same as the static link weight, and routes each primary tunnel using the generalized CSPF algorithm (step 409). For each network IP link, enough capacity is assigned to it so that it can carry all assigned traffic flows through it without violating its maximum allowed utilization level (step 411). All IP link capacity assignments may be in multiples of a basic unit, for example, 10 Gbps or 40 Gbps, with capacities symmetric in forward and return directions. Individual IP traffic flow capacity requirements are usually in one direction. An important parameter for each IP link is the amount of residual capacity which is the leftover capacity that can be assigned to future traffic flows without violating its maximum allowed utilization level. In other words, the existing capacity used by primary tunnels using the link plus the residual capacity should just raise the utilization level of the link to its maximum allowed utilization level. For each link, the residual capacity is computed (step 413). The residual capacity depends on the maximum allowed utilization level which may in turn depend on the failure condition. Therefore, there may be multiple residual capacity values for a link depending on the failure condition.

An existing IP network or IP network under construction is analyzed and simulated for each defined failure condition scenario. There are two types of tasks under each failure condition scenario, pre-computation of backup tunnel paths (steps 421 to 445, first phase of fast reroute) and a rerouting path for primary tunnels affected by a failure condition (steps 451 to 475, second phase of fast reroute).

Pre-computation of backup tunnel paths for each failure scenario commences (step 421). One failure condition scenario is considered, which may include one or multiple failures of links and Routers. Since each failure scenario is independent of others, the initial values of all link residual capacities are set to their values under a no-failure condition (the residual capacities will keep changing throughout the backup tunnel computations of this failure scenario, as explained in step 441, but would not depend on other failure scenarios). The set of backup tunnels needed to bypass the failure scenario are identified (step 423). One backup tunnel needed for this failure scenario is considered and starts the task of assigning dynamic link weights to each link of the network (step 425). One network link requiring the setting of a dynamic link weight is considered (step 427). A check is performed whether the link has failed as part of the failure scenario (step 429). If yes, then the dynamic link weight is set to infinity (step 431). If not, a check is performed if the link has enough residual capacity to carry the traffic of the backup tunnel (step 433). If yes, then the link is designated as a preferred link for routing the backup tunnel and the dynamic link weight is set as the static link weight (step 435). If not, then the link is designated as a less-preferred link (only to be used if preferred links alone cannot perform the routing) for routing the backup tunnel and the dynamic link weight is set higher than the static link weight (by multiplying or adding a factor to the static link weight) (step 437). A check is performed if all network links have been considered (step 439). If not, then the next network link is considered (step 427). If all network links have been considered, the backup tunnel is routed using a CSPF algorithm (step 441). The result is if any link exceeds its maximum link utilization limit, then its capacity is augmented. The capacity augmentation is in multiples of a basic unit and may be the same in both directions (step 441). The residual capacities of all links carrying the backup tunnel are updated. If a link capacity is augmented then its residual capacity under a no-failure condition is also updated. A check is performed if all backup tunnels have been considered (step 441). If not, then the next backup tunnel is considered (step 425). If all backup tunnels have been considered, then a check is performed if all failure scenarios have been considered (step 443). If not, the next failure scenario is considered (step 423). If all failure scenarios have been considered, all backup tunnel path pre-computations have been completed (step 445).

Re-routing of end-to-end primary tunnels for each failure scenario commences (step 451). One failure scenario is considered, and the initial values of all link residual capacities are set to their values under a no-failure condition (the residual capacities will keep changing throughout the primary tunnel rerouting computations of this failure scenario, explained in step 471, but would not depend on other failure scenarios) (step 453). The set of primary tunnels affected by the failure scenario and thereby requiring rerouting are also identified (step 453). The traffic flows previously used by the affected primary tunnels would not be required any more and may be released, thereby increasing the residual capacities of links that were carrying the older primary tunnels. This implies updates in residual capacities of some links (step 453). One primary tunnel affected by this failure scenario is considered and the task of assigning dynamic link weights to each link of the network begins (step 455). One network link requiring the setting of a dynamic link weight is considered (step 457). A check is performed whether the link has failed as part of the failure scenario (step 459). If yes, then the dynamic link weight is set to infinity (step 461). If not, a check is performed if the link has enough residual capacity to carry the traffic of the affected primary tunnel (step 463). If yes, the link is designated as a preferred link for rerouting the affected primary tunnel and the dynamic link weight is set as the static link weight (step 465). If not, the link is designated as a less-preferred link (only to be used if preferred links alone cannot perform the rerouting) for rerouting the affected primary tunnel and the dynamic link weight is set higher than the static link weight (by multiplying or adding a factor to the static link weight) (step 467). A check is performed if all network links have been considered (step 469). If not, then the next network link is considered (step 457). If all network links have been considered, the affected primary tunnel is rerouted using a CSPF algorithm (step 471). As a result of this if any link exceeds its maximum link utilization limit, then its capacity is augmented. Capacity augmentation is in multiples of a basic unit and may be the same in both directions. The residual capacities of all links carrying the affected primary tunnel are updated. If a link capacity is augmented then its residual capacity under a no-failure condition is also updated. A check is performed if all affected primary tunnels have been considered. If not, then the next affected primary tunnel is considered (step 455). If all affected primary tunnels have been considered, a check is performed if all failure scenarios have been considered (step 473). If not, then the next failure scenario is considered (step 453). If all failure scenarios have been considered, end-to-end primary tunnel rerouting is completed (step 475).

The operation of the two-phase fast reroute method for an operating IP network which already has capacity assigned to each link based on the network design approach (steps 401 to 475) follows: Under a no-failure condition, all the primary tunnels are routed using the CSPF algorithm (steps 401 to 413) and backup tunnels are pre-computed to bypass failure condition scenarios (steps 421 to 445) (step 481). As long as there are no failures, traffic flows over the primary tunnels only. The network operates this way until a failure condition occurs (step 483). The failure is detected immediately by Routers adjacent to the failure condition and they immediately switch traffic over to the backup tunnels that have been pre-computed to bypass this failure scenario (step 485). The traffic switchover is very fast, typically less than 100 ms. All primary tunnels affected by the failure condition are rerouted (after complete knowledge of failure conditions are obtained at all the Routers through routing protocols such as OSPF-TE) using CSPF algorithms (as specified in steps 451 to 475) (step 487). The entire rerouting process is not fast and may take several seconds. While the rerouting of primary tunnels is being performed, the old primary tunnels in conjunction with their backup tunnels continue to carry traffic so there is no traffic loss. After new versions of all primary tunnels are established, traffic is switched from the old to the new primary tunnels without any traffic loss. After the failure scenario is repaired, all primary tunnels, previously rerouted due to the failure scenario, are rerouted again to return to their original routes before the failure scenario happened (step 489). Traffic switchover in this case also happens without any traffic loss. The network keeps operating this way until another failure condition scenario occurs (step 483).

An important aspect of the two-phase method is that an optimized traffic engineering method is used during the first and second phases of restoration that maximizes sharing among all independent failure scenarios and minimizes a cost metric that is used in assigning static link weights (step 407). Traditional IP routing based on OSPF/IS-IS uses static link weights and so is significantly less efficient than embodiments using the traffic engineering algorithm using dynamic link weights.

An evaluation was performed via simulation on a hypothetical backbone network comprising 28 Routers and 45 fiber links. FIG. 2 shows the exemplary backbone network. The number over each link is the distance between two nodes in 10-mile units. Each fiber pair is assumed to support 100 wavelengths. There are two types of traffic generated at each node, IP traffic, and wavelength traffic. Results are shown for IP traffic which is routed over IP links where each IP link is over a sequence of one or more fiber links. All traffic demands are generated based on node traffic probability, which is proportional to the node degree. A demand was randomly selected according to source node traffic probability and destination node traffic probability. For IP traffic, the bandwidth of each demand is uniformly generated from an interval (100, 1000) Mbps and there are 5,000 such demands. Each IP demand flow has a 40% chance to be best effort traffic and a small probability (up to 10%) requiring double failure restoration. For simplicity, the IP link bandwidths are assumed to be deployed in units of 10 Gbps channels (the associated IP port may either be an OC-192 port or a 10 Gigabit Ethernet port, the latter being less expensive).

For each IP link the static link weight metric is assumed to be distance plus 20 miles (this allows OSPF shortest path routing to be shortest distance routing as well in most cases but in the event of two nearly equal distance paths it chooses one with fewer hops). The performance is defined as $$\frac{\text{total wavelength mile for both service and restoration}}{\text{wavelength mile for service}} - 1. \quad (1)$$

Table 1 compares three IP design alternatives in terms of restoration overbuild and cost. Alternative 1 uses 2-phase fast reroute with optimized traffic engineering. Alternative 2 uses IP reroute using OSPF shortest path routing and is the most common routing mechanism used in today's IP network. Alternative 3 uses simple MPLS fast reroute, i.e., no traffic engineering and uses shortest path routing during the two phases. The results clearly show that the two-phase fast reroute with optimized traffic engineering (the main aspect of the invention) performs significantly better than the other two.

TABLE 1

| IP Routing alternative | # of IP Logical Links | Capacity in 1000 Wavelength-Miles | | Restoration overbuild | # of IP 10 Gbps Physical Links (W + Rest) | Normalized Total Cost |
|---|---|---|---|---|---|---|
| | | Working Path | Work. Path + Rest. | | | |
| 1 | 92 | 157.46 | 213.0 | 0.353 | 520 | 100 |
| 2 | 92 | 157.46 | 305.87 | 0.943 | 675 | 140.9 |
| 3 | 92 | 157.46 | 335.81 | 1.132 | 752 | 155.1 |

The restoration design satisfies network reliability requirements for IP services. The systems and methods meet the requirement of sub-second restoration and also maximize sharing among single or double failures of links, routers, and SRLGs, and also among different phases of restoration while minimizing overall capacity or cost.

One or more embodiments of the present invention have been described. Nevertheless, it will be understood that various modifications may be made without departing from the spirit and scope of the invention. Accordingly, other embodiments are within the scope of the following claims.

What is claimed is:

1. A method for restoring traffic routed in an Internet Protocol (IP) network after the IP network experiences an IP router failure, an IP link failure, or a combination of failures comprising:
  establishing a traffic matrix for the IP network;
  defining a set of failure condition scenarios for the IP network according to a degree of reliability desired wherein a failure condition scenario specifies one or more IP link failures, one or more IP router failures, or a combination of failures according to the degree of reliability desired and specifies which traffic of the traffic matrix needs to be restored;
  defining a maximum bandwidth utilization level for each IP link during normal operating conditions and a maximum bandwidth utilization level during failure conditions wherein a percentage of an IP link maximum bandwidth utilization level is IP link bandwidth capacity and a percentage of the IP link maximum bandwidth utilization level is IP link residual bandwidth capacity;
  defining a static weight for each IP link wherein an IP link static weight is an optimizing metric of total network capacity;
  creating primary tunnels for the traffic comprising:
    defining a dynamic weight for each IP link wherein an IP link dynamic weight may be the same as its static weight, a function of the static weight, or infinity;
    setting each IP link dynamic weight as its IP link static weight;
    routing each primary tunnel using a Constrained Shortest Path First (CSPF) method based on each of the IP link dynamic weights; and
    for each IP link, assigning enough IP link bandwidth capacity to allow all primary tunnels routed through this IP link without violating the IP link's maximum bandwidth utilization level;
  in a first phase comprising:
    pre-computing backup tunnels for traffic that is affected by one of the failure condition scenarios;
    routing each backup tunnel using a CSPF method optimized with each IP link's dynamic weight which may change to adjust to traffic conditions;

if any IP link exceeds its maximum bandwidth utilization level, augmenting that IP link's maximum bandwidth utilization level in multiples of a basic unit of bandwidth reusing its IP link residual bandwidth capacity;
storing a backup tunnel for traffic relating to each failure condition scenario;
during an actual IP network failure condition, in a second phase comprising:
matching the actual network failure condition to a failure condition scenario;
switching traffic affected by the network failure condition to a backup tunnel corresponding to that failure condition scenario;
creating new end-to-end tunnels for traffic affected by the actual network failure condition;
routing each end-to-end tunnel using a CSPF method optimized with each IP link's dynamic weight which may change to adjust to traffic conditions;
if any IP link exceeds its maximum bandwidth utilization level, augmenting that IP link's maximum bandwidth utilization level in multiples of a basic unit of bandwidth reusing its IP link residual bandwidth capacity; and
switching network traffic over a combination of primary tunnels and backup tunnels to the new end-to-end tunnels.

2. The method according to claim 1 wherein creating new end-to-end tunnels further comprises using failure information and IP link bandwidth availability information from the IP network.

3. The method according to claim 2 wherein the failure information and IP link bandwidth availability information from the IP network is obtained from Interior Gateway Protocol (IGP) and Traffic Engineering (TE) extensions.

4. The method according to claim 1 wherein establishing the traffic matrix is based on network monitoring and traffic forecasting.

5. The method according to claim 1 further comprising providing for sufficient IP link bandwidth capacity for all traffic routed over a backup tunnel or a new end-to-end tunnel by optimizing IP link sharing among all independent failure condition scenarios for backup tunnel and new end-to-end tunnels by minimizing total IP link bandwidth capacity, total IP link bandwidth cost, or a linear combination of total IP link bandwidth capacity and cost.

6. The method according to claim 5 wherein total IP link bandwidth cost includes transport cost and IP port cost.

7. The method according to claim 6 wherein IP link dynamic weights depend on an IP link's bandwidth capacity, latency, and IP port costs.

8. The method according to claim 1 wherein failed IP links that are part of a network failure condition are assigned infinite IP link dynamic weight and are not considered for routing.

9. The method according to claim 1 wherein during backup tunnel routing, an IP link dynamic weight is its static weight if it has adequate capacity to carry the traffic of the backup tunnel.

10. The method according to claim 1 wherein during backup tunnel routing, an IP link dynamic weight is set higher than its static weight by adding to or multiplying its static weight by a factor if it does not have adequate capacity to carry the traffic of the backup tunnel.

11. The method according to claim 1 wherein during end-to-end tunnel routing, an IP link dynamic weight is its static weight if it has adequate capacity to carry the traffic of the end-to-end tunnel.

12. The method according to claim 1 wherein during end-to-end tunnel routing, an IP link dynamic weight is set higher than its static weight by adding to or multiplying its static weight by a factor if it does not have adequate capacity to carry the traffic of the end-to-end tunnel.

13. The method according to claim 1 further comprising establishing an inventory of IP routers and IP links.

14. The method according to claim 1 further comprising, for each IP link, updating its residual bandwidth capacity after satisfying the needs of all primary tunnels that have been routed over that IP link.

15. A system for restoring traffic routed in an Internet Protocol (IP) network after the IP network experiences an IP router failure, an IP link failure, or a combination of failures comprising:
means for establishing a traffic matrix for the IP network;
means for defining a set of failure condition scenarios for the IP network according to a degree of reliability desired wherein a failure condition scenario specifies one or more IP link failures, one or more IP router failures, or a combination of failures according to the degree of reliability desired and specifies which traffic of the traffic matrix needs to be restored;
means for defining a maximum bandwidth utilization level for each IP link during normal operating conditions and a maximum bandwidth utilization level during failure conditions wherein a percentage of an IP link maximum bandwidth utilization level is IP link bandwidth capacity and a percentage of the IP link maximum bandwidth utilization level is IP link residual bandwidth capacity;
means for defining a static weight for each IP link wherein an IP link static weight is an optimizing metric of total network capacity;
creating primary tunnels for the traffic comprising:
means for defining a dynamic weight for each IP link wherein an IP link dynamic weight may be the same as its static weight, a function of the static weight, or infinity;
means for setting each IP link dynamic weight as its IP link static weight;
means for routing each primary tunnel using a Constrained Shortest Path First (CSPF) method based on each of the IP link dynamic weights; and
for each IP link, means for assigning enough IP link bandwidth capacity to allow all primary tunnels routed through this IP link without violating the IP link's maximum bandwidth utilization level;
in a first phase comprising:
means for pre-computing backup tunnels for traffic that is affected by one of the failure condition scenarios;
means for routing each backup tunnel using a CSPF method optimized with each IP link's dynamic weight which may change to adjust to traffic conditions;
if any IP link exceeds its maximum bandwidth utilization level, means for augmenting that IP link's maximum bandwidth utilization level in multiples of a basic unit of bandwidth reusing its IP link residual bandwidth capacity;
means for storing a backup tunnel for traffic relating to each failure condition scenario;
during an actual IP network failure condition, in a second phase comprising:

means for matching the actual network failure condition to a failure condition scenario;

means for switching traffic affected by the network failure condition to a backup tunnel corresponding to that failure condition scenario;

means for creating new end-to-end tunnels for traffic affected by the actual network failure condition;

means for routing each end-to-end tunnel using a CSPF method optimized with each IP link's dynamic weight which may change to adjust to traffic conditions;

if any IP link exceeds its maximum bandwidth utilization level, means for augmenting that IP link's maximum bandwidth utilization level in multiples of a basic unit of bandwidth reusing its IP link residual bandwidth capacity; and means for switching network traffic over a combination of primary tunnels and backup tunnels to the new end-to-end tunnels.

16. The system according to claim 15 wherein failed IP links that are part of a network failure condition are assigned infinite IP link dynamic weight and are not considered for routing.

17. The system according to claim 15 wherein during backup tunnel routing, an IP link dynamic weight is its static weight if it has adequate capacity to carry the traffic of the backup tunnel.

18. The system according to claim 15 wherein during end-to-end tunnel routing, an IP link dynamic weight is its static weight if it has adequate capacity to carry the traffic of the end-to-end tunnel.

19. The system according to claim 15 wherein during backup tunnel routing, an IP link dynamic weight is set higher than its static weight by adding to or multiplying its static weight by a factor if it does not have adequate capacity to carry the traffic of the backup tunnel.

20. The system according to claim 15 wherein during end-to-end tunnel routing, an IP link dynamic weight is set higher than its static weight by adding to or multiplying its static weight by a factor if it does not have adequate capacity to carry the traffic of the end-to-end tunnel.

* * * * *